No. 614,250. Patented Nov. 15, 1898.
F. A. KERSHAW.
CHAINLESS BICYCLE.
(Application filed Nov. 22, 1897.)
(No Model.)
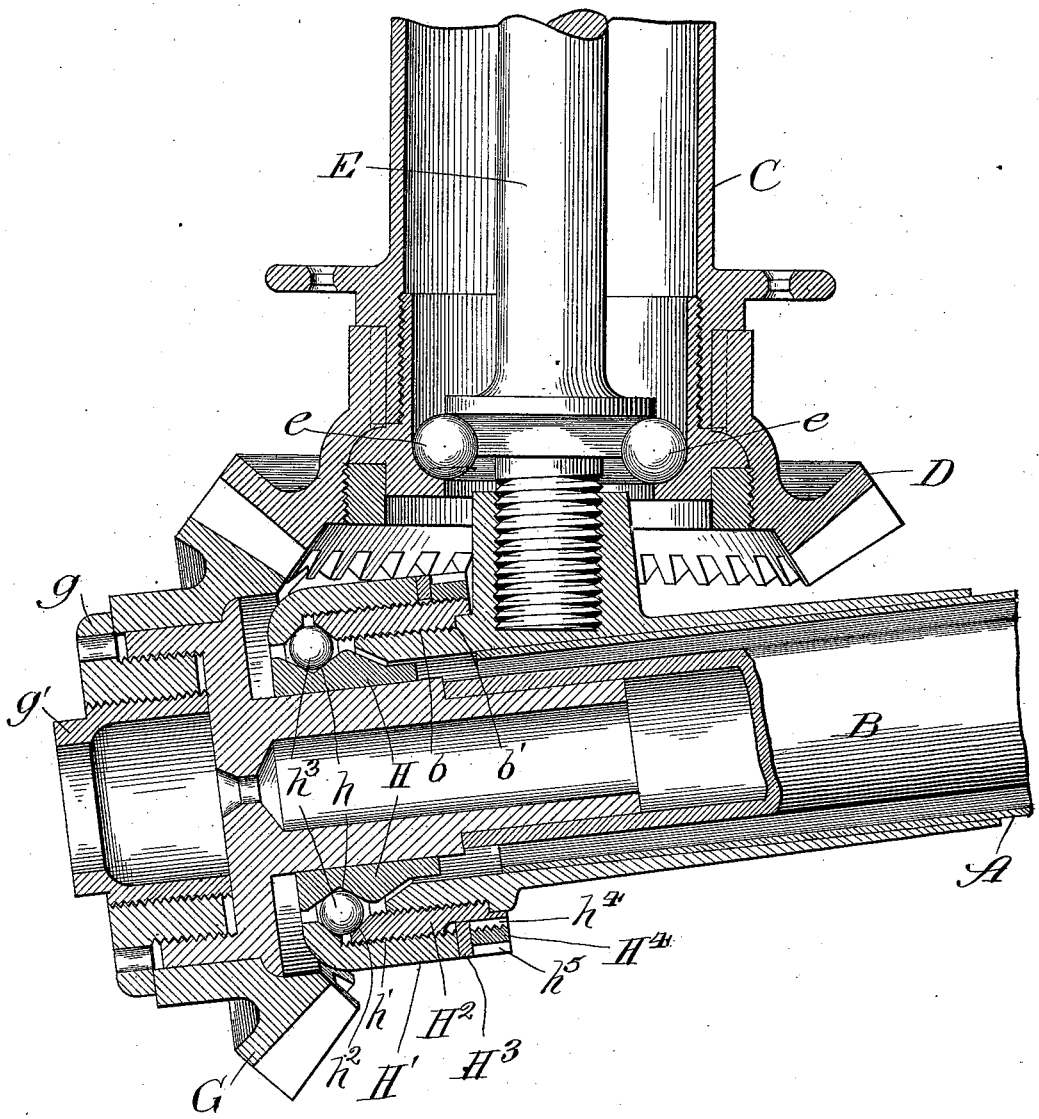

UNITED STATES PATENT OFFICE.

FRANCIS A. KERSHAW, OF KENOSHA, WISCONSIN.

CHAINLESS BICYCLE.

SPECIFICATION forming part of Letters Patent No. 614,250, dated November 15, 1898.

Application filed November 22, 1897. Serial No. 659,475. (No model.)

*To all whom it may concern:*

Be it known that I, FRANCIS A. KERSHAW, a citizen of the United States, residing at Kenosha, in the county of Kenosha and State of Wisconsin, have invented certain new and useful Improvements in Chainless Bicycles, of which the following is a specification.

My invention relates to that class of bicycles known as "chainless" bicycles having a crank-shaft and rear driven wheel each provided with a bevel-gear and an intermediate longitudinal shaft also having bevel-gears for transmitting the power and motion from the crank-shaft to the rear driving-wheel, and relates particularly to the form of bearing used for journaling one end of the intermediate shaft.

The object of my invention is to provide a chainless bicycle with a longitudinal movable intermediate shaft and means for journaling one end of such shaft and adjusting the antifriction-bearing thereof.

The invention consists in the features, combinations, and details of construction hereinafter described.

The accompanying drawing represents a plan sectional view of a portion of the rear fork of a bicycle, the driving-wheel hub, a longitudinal movable shaft, and gear mechanism for transmitting the power and motion from the shaft to the hub of the rear driving-wheel.

In this class of bicycles it is well known that where an intermediate longitudinal or horizontal shaft is used for transmitting the power and motion of the crank-shaft to the rear driving-wheel some means must be provided for adjusting the intermediate shaft to obtain the proper engagement of the bevel-gearing. It is therefore desirable that but one end of the shaft be provided with mechanism for adjusting the shaft and that in such cases one bearing should be provided for permitting an independent longitudinal movement of the shaft—that is, the shaft should be permitted to move without in any way disturbing the relation of the parts that go to form the ball-bearing. The principal object of my invention, therefore, is to provide a wheel of this class with a horizontal shaft and a ball-bearing at one end thereof, so that the shaft may be supported and rotated in this bearing and have an independent longitudinal movement therein whenever it is desirable or necessary.

In illustrating and describing my invention I will only illustrate and describe such parts as I consider to be new, taken in connection with as much that is old as is necessary to properly disclose my invention and enable persons skilled in the art to practice the same, leaving out of consideration other and well-known parts, which, if described herein, would lead to ambiguity, confusion, and prolixity.

In fitting a bicycle of the safety or rear-driven type with my improvements I use a frame portion, one of the lower rear-fork members A being hollow or formed of a tube, in which is mounted a substantially horizontal intermediate shaft B. This intermediate shaft may be held adjustably or rigidly at the front end thereof, as seems desirable or necessary, or in any usual manner. The means for primarily operating this intermediate shaft are so well known that I deem it unnecessary to describe it further than to say that it may be provided with a bevel-gear at the front end thereof meshing with the bevel-gear on a crank-shaft of any of the usual constructions. A hub C is provided which forms the hub of a rear driving-wheel, and is mounted in the usual manner between the rear fork of the frame, and is provided with a bevel-gear D, secured thereto in any convenient manner. The hub is further mounted upon an axle E by means of a ball-bearing e. The intermediate shaft is provided with a bevel-gear G at the rear end thereof, which is held in place by means of the locking-nuts g and g'. To furnish a bearing and to facilitate the rotation of the intermediate shaft and have an independent longitudinal movement therein, I provide a sleeve H, having an angular groove h in the periphery thereof. This sleeve is bored out to easily fit the shaft, so that the shaft may slip therein, rotate therewith, but have an independent longitudinal movement whenever it is necessary to adjust the position of the shaft. I provide a cup-shaped piece H', which is provided with an inner threaded surface h' and has an intermediate ring $H^2$, screw-threaded therein, which is provided also with an inner threaded opening.

This intermediate threaded ring is provided with an angular portion $h^2$ at its inner end, which, in connection with the cup and angular groove of the central sleeve, forms what might be termed a "four-point bearing." In order to lock these parts in their relative operative positions—that is, so that they may form a race for the antifriction-balls $h^3$—I make the intermediate threaded ring longer than the threaded opening in the cup, so that it may project the desired distance outside of the cup, and I prefer to provide the outer surface of this intermediate ring with a key-slot $h^4$, in which the tongue of a washer $H^3$ may be inserted so as to prevent the washer from turning, but allow it to be slipped on or off or moved longitudinally, as may be desired. A locking-ring $H^4$ is next provided and screw-threaded, so that it may engage with the intermediate ring and be forced against the washer in such manner as to prevent any movement of the parts unless something more than ordinary force be employed. This locking-ring is slotted longitudinally or notched, as at $h^5$, so that a spanner-wrench may be used to tighten or loosen the parts. The frame portion or the tubular member of the rear fork is screw-threaded, as at $b$, and engaged with the threads on the inner surface of the intermediate ring, so that the entire bearing may be held thereon and locked against a shoulder $b'$ to prevent any movement thereof until more than ordinary force is used.

In assembling the parts the bearing parts are first assembled and placed in threaded engagement with the tubular member of the frame. The horizontal shaft is then passed through into position and adjusted so as to obtain the proper "mesh" or engagement of the gear-teeth without in any way disturbing the bearing. By this arrangement it will be seen that the rear bearing may be assembled and all "end shake" or lateral play taken up, so as to provide the proper "race" for the antifriction-balls to rotate in. The horizontal shaft may be inserted, removed, or adjusted without in any way disturbing the relation of the parts of the bearing, the bearing merely acting to hold the shaft in its lateral position and obtain the proper engagement of the teeth thereby and not in any way hinder or impede its longitudinal movement or adjustment.

I claim—

1. In a chainless bicycle, the combination of a frame portion, an intermediate horizontal driving-shaft provided with a beveled gear at the end thereof, a bearing portion for such driving-shaft formed of a sleeve loosely mounted thereon so as to permit independent longitudinal movement of the shaft, a cupped ring secured to the frame and surrounding the bearing-sleeve, and an antifriction ball-bearing between the bearing-sleeve and cupped ring, substantially as described.

2. In a chainless bicycle, the combination of a frame portion provided with a tubular member forming a part of the lower rear fork of the bicycle, an intermediate horizontal driving-shaft in such tubular member provided with a bevel-gear at the rear end thereof, a bearing portion for such driving-shaft formed of a sleeve loosely mounted thereon, a cup surrounding such sleeve, an intermediate threaded ring in such cup engaging with the cup and screw-threaded on the frame portion, the whole acting to prevent the movement of the shaft laterally but permitting it to have an independent longitudinal movement therein, substantially as described.

3. An antifriction-bearing for a velocipede comprising a sleeve in which a shaft or similar element may be independently and longitudinally mounted and provided with an angular groove in its periphery, a cup surrounding the sleeve portion and provided with screw-threads on its inner surface, a ring having threads on its outer and inner surfaces arranged intermediate the cup and the central sleeve, a locking-nut on the end of the intermediate threaded ring and a washer between such locking-nut and ring, and antifriction-balls contacting the angular groove in the sleeve, the intermediate ring and the cup, substantially as described.

FRANCIS A. KERSHAW.

Witnesses:
THOMAS F. SHERIDAN,
THOMAS B. MCGREGOR.